US009323421B1

(12) United States Patent
Cronin

(10) Patent No.: US 9,323,421 B1
(45) Date of Patent: Apr. 26, 2016

(54) TIMER, APP, AND SCREEN MANAGEMENT

(71) Applicant: GrandiOs Technologies, LLC, Charleston, SC (US)

(72) Inventor: John Cronin, Bonita Springs, FL (US)

(73) Assignee: GrandiOs Technologies, LLC, Charleston, SC (US)

( * ) Notice: Subject to any disclaimer, the term of this patent is extended or adjusted under 35 U.S.C. 154(b) by 0 days.

(21) Appl. No.: 14/628,943

(22) Filed: Feb. 23, 2015

Related U.S. Application Data

(60) Provisional application No. 62/007,901, filed on Jun. 4, 2014.

(51) Int. Cl.
 *G06F 9/445* (2006.01)
 *G06F 3/0481* (2013.01)
 *G06F 9/44* (2006.01)

(52) U.S. Cl.
 CPC .............. *G06F 3/04817* (2013.01); *G06F 8/70* (2013.01)

(58) Field of Classification Search
 CPC combination set(s) only.
 See application file for complete search history.

(56) References Cited

U.S. PATENT DOCUMENTS

| 8,589,667 | B2 | 11/2013 | Mujtaba et al. |
| 8,611,930 | B2 | 12/2013 | Louboutin et al. |
| 8,620,344 | B2 | 12/2013 | Huang et al. |
| 8,626,465 | B2 | 1/2014 | Moore et al. |
| 8,630,216 | B2 | 1/2014 | Deivasigamani et al. |
| 8,660,501 | B2 | 2/2014 | Sanguinetti |
| 8,706,044 | B2 | 4/2014 | Chang et al. |
| 8,724,723 | B2 | 5/2014 | Panicker et al. |
| 8,750,207 | B2 | 6/2014 | Jeong et al. |
| 8,793,094 | B2 | 7/2014 | Tam et al. |
| 8,816,868 | B2 | 8/2014 | Tan et al. |
| 8,831,529 | B2 | 9/2014 | Toh et al. |
| 8,831,655 | B2 | 9/2014 | Burchill et al. |
| 8,836,851 | B2 | 9/2014 | Brunner |
| 8,843,158 | B2 | 9/2014 | Nagaraj |
| 8,849,308 | B2 | 9/2014 | Marti et al. |
| 8,862,060 | B2 | 10/2014 | Mayor |
| 8,873,418 | B2 | 10/2014 | Robinson et al. |
| 8,874,090 | B2 | 10/2014 | Abuan et al. |
| 8,917,632 | B2 | 12/2014 | Zhou et al. |
| 8,934,921 | B2 | 1/2015 | Marti et al. |
| 2003/0115226 | A1* | 6/2003 | Gopalan ............ G06F 17/30194 |
| 2007/0083827 | A1* | 4/2007 | Scott ...................... G06F 9/4443 715/811 |
| 2011/0028138 | A1* | 2/2011 | Davies-Moore .... G06F 3/04817 455/418 |
| 2013/0303192 | A1 | 11/2013 | Louboutin |
| 2013/0317835 | A1 | 11/2013 | Mathew |
| 2013/0328917 | A1 | 12/2013 | Zhou |
| 2013/0331087 | A1 | 12/2013 | Shoemaker |
| 2013/0331118 | A1 | 12/2013 | Chhabra |
| 2013/0331137 | A1 | 12/2013 | Burchill |
| 2013/0332108 | A1 | 12/2013 | Patel |
| 2013/0332156 | A1 | 12/2013 | Tackin |
| 2014/0062773 | A1 | 3/2014 | Macgougan |
| 2014/0065962 | A1 | 3/2014 | Le |

(Continued)

*Primary Examiner* — Peiyong Weng
(74) *Attorney, Agent, or Firm* — Polsinelli LLP

(57) ABSTRACT

Methods and systems for providing timer, app, and screen management are provided. Information may be stored in memory regarding a plurality of applications. Each application may be associated with a timer classification rule indicating at least one time event associated with a new classification. It may be detected when the time event has occurred for an identified application. The new classification associated with the calendar event may be applied to the identified application. The application may be moved to a designated screen of a mobile device based on the applied classification.

15 Claims, 6 Drawing Sheets

(56) References Cited

U.S. PATENT DOCUMENTS

| | | |
|---|---|---|
| 2014/0071221 A1 | 3/2014 | Dave |
| 2014/0105084 A1 | 4/2014 | Chhabra |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0201681 A1 * | 7/2014 | Mahaffey .......... H04M 1/72569 715/846 |
| 2014/0222335 A1 | 8/2014 | Piemonte |
| 2014/0232633 A1 | 8/2014 | Shultz |
| 2014/0232634 A1 | 8/2014 | Piemonte |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0364089 A1 | 12/2014 | Lienhart |
| 2014/0364148 A1 | 12/2014 | Block |
| 2014/0365120 A1 | 12/2014 | Vulcano |
| 2015/0011242 A1 | 1/2015 | Nagaraj |
| 2015/0026623 A1 | 1/2015 | Horne |
| 2015/0031397 A1 | 1/2015 | Jouaux |

* cited by examiner

TIMER, APP, AND SCREEN MANAGEMENT

CROSS-REFERENCE TO RELATED APPLICATIONS

The present application claims the priority benefit of U.S. provisional application No. 62/007,901 filed Jun. 4, 2014 and entitled "Timer, App, & Management," the disclosure of which is hereby incorporated by reference.

BACKGROUND

1. Field of the Invention

The present invention generally relates to management of mobile devices. More specifically, the present invention relates to a timer, app, and screen management system on mobile devices.

2. Description of the Related Art

The term "app" is a commonly-used abbreviation of the term "application software." In many contexts, "app" is also commonly-used to refer specifically to mobile applications. Mobile applications (or "mobile apps") are application software designed to run on smartphones, tablet computers (including electronic reading devices or e-readers), and other mobile devices. Apps may be made available by application developers through application distribution platforms, many of which are typically operated by the owner of the mobile operating system, such as the Apple® App Store℠, Google Play™, Windows® Store, and BlackBerry® App World™. Some apps are available for free, while others must be bought. Usually, such apps are downloaded from the platform to a target device, such as an iPhone®, BlackBerry®, Android®, or Windows® phone, other mobile device, laptop, or desktop computer.

Mobile apps were originally offered for general productivity and information retrieval, including email, calendar, contacts, stock market, and weather information. However, public demand and the availability of developer tools drove rapid expansion into other categories, such as mobile games, factory automation, GPS, and location-based services, banking, order-tracking, and ticket purchases. The explosion in number and variety of apps made application management a challenge.

Generally, the app store or download app (e.g., App Store, iTunes) through which the user obtained an app may provide backup data and management tools. Further, apps can be moved into folders or between screens of a mobile device. In addition, various settings for apps may be managed by function (e.g., turning geolocation on and off).

Given the exceedingly large number of available apps, there are often many unused apps in the handheld device. All apps that are downloaded remain on the handheld until they are deleted, which can cause the handheld to become slow and less responsive to the user. There is not enough flexibility for apps. Moreover, there is currently no way to automate the download or deletion of apps that have limited, temporary, or seasonal uses.

There is, therefore, a need in the art for improved systems and methods for timer, app, and screen management for mobile applications.

SUMMARY OF THE CLAIMED INVENTION

Embodiments of the present invention provide methods and systems for providing for timer, app, and screen management. Information may be stored in memory regarding a plurality of applications. Each application may be associated with a timer classification rule indicating at least one time event associated with a new classification. It may be detected when the time event has occurred for an identified application. The new classification associated with the calendar event may be applied to the identified application. The application may be moved to a designated screen of a mobile device based on the applied classification.

Various embodiments of the present invention may include methods for timer, app, and screen management. Such methods may include storing information in memory regarding a plurality of applications. Each application may be associated with a timer classification rule indicating at least one time event associated with a new classification. Methods may further include executing instructions to detect when the time event has occurred for an identified application, to apply the new classification associated with the calendar event to the identified application, and to move the application to a designated screen of a mobile device based on the applied classification.

Embodiments may further include apparatuses for timer, app, and screen management. Such apparatuses may include memory that stores information regarding a plurality of applications. Each application may be associated with a timer classification rule indicating at least one time event associated with a new classification. The apparatuses may further include a processor that executes instructions to detect when the time event has occurred for an identified application, to apply the new classification associated with the calendar event to the identified application, and to move the application to a designated screen of a mobile device based on the applied classification.

Embodiments of the present invention may further include non-transitory computer-readable storage media, having embodied thereon a program executable by a processor to perform methods for providing for timer, app, and screen management as described herein.

DETAILED DESCRIPTION

Embodiments of the present invention provide methods and systems for timer, app, and screen management. Information may be stored in memory regarding a plurality of applications. Each application may be associated with a timer classification rule indicating at least one time event associated with a new classification. It may be detected when the time event has occurred for an identified application. The new classification associated with the calendar event may be applied to the identified application. The application may be moved to a designated screen of a mobile device based on the applied classification.

Timer, app, and screen management app allow for apps to be automatically moved to a designated screen when the app becomes old, expired, or has not been used for a certain duration. The designated screen may hold multiple such apps, which may be deleted or moved into storage at certain points in time. Timer modes may include a holiday mode where certain apps would be downloaded or turned off on a designated holiday and a calendar expiration mode where an app would be turned off by a certain expiration date. Advertisers and 3rd party sharing of the database for apps may also be allowed where they are timed in or timed out, or used and then gone.

Figure 1:
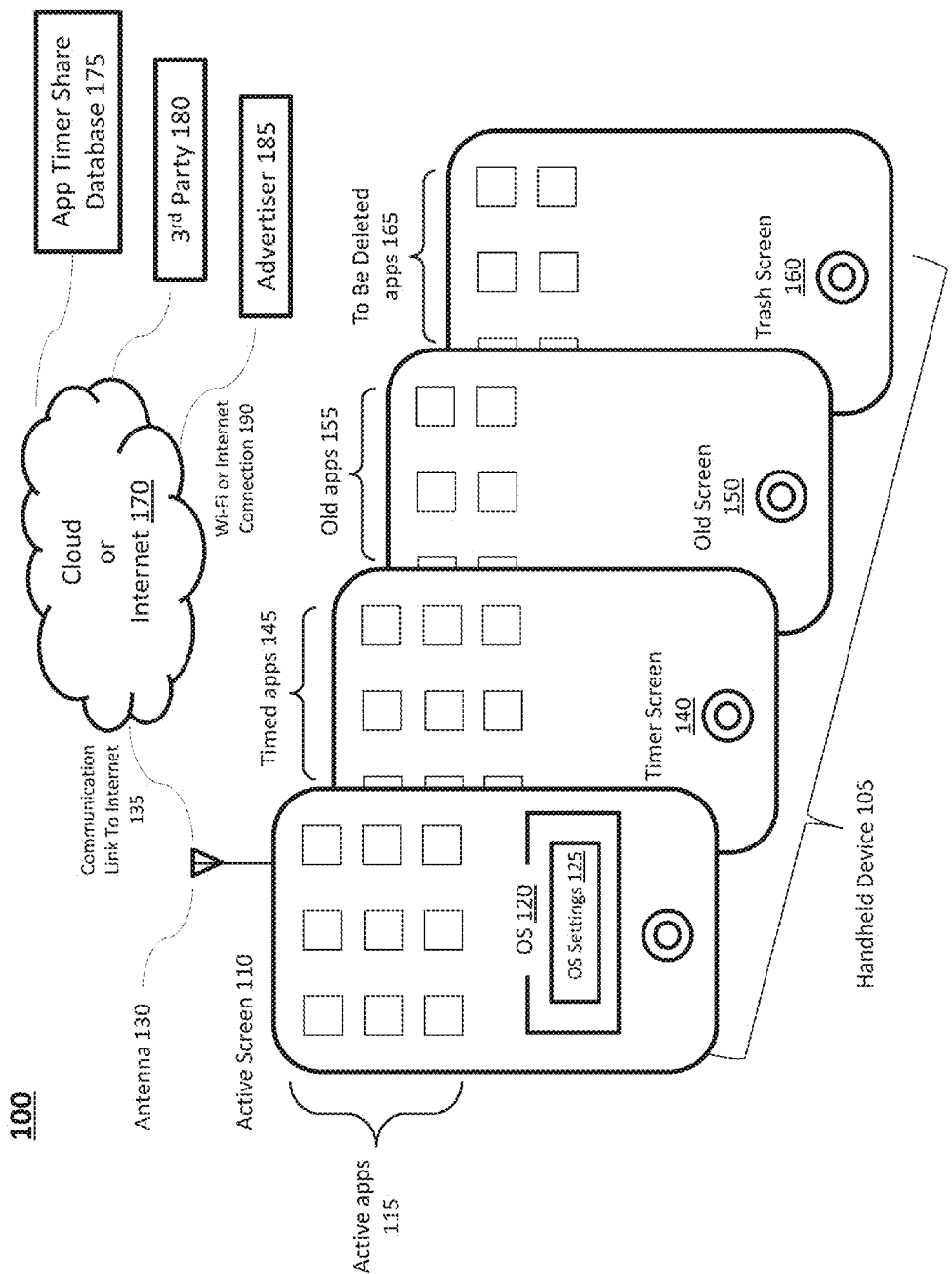
FIG. 1 illustrates an exemplary network environment in which a system for providing for timer, app, and screen management may be implemented.

FIG. 1 illustrates an exemplary network environment 100 in which a system for providing for timer, app, and screen management may be implemented. Network environment 100 may include handheld device 105, cloud (or Internet) communication network 170, app timer share database 175, third party 180, and advertiser 185.

Users may use any number of different electronic user devices 105, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 170. User devices 105 may also be configured to access data from other storage media, such as memory cards or disk drives as may be appropriate in the case of downloaded services. User devices 105 may include standard hardware computing components such as network and media interfaces, non-transitory computer-readable storage (memory), and processors for executing instructions that may be stored in memory. User devices 105 may further include an operating system 120, operating system settings 125, antenna 130. Various screens of the user device may include an active screen 110 for active apps 115, a timer screen 140 for timed apps 145, an old screen 150 for old apps 155, and a trash screen 160 for apps to be deleted 165.

Operating system (OS) 120 is a collection of software that manages computer hardware resources and provides common services for computer programs, including applications. The operating system 120 is an essential component of the system software in a computer system. Applications are usually developed for a specific operating system 120 and therefore rely on the associated operating system 120 to perform its functions. For hardware functions such as input and output and memory allocation, the operating system 120 acts as an intermediary between applications and the computer hardware. Although application code is usually executed directly by the hardware, applications may frequently make a system call to an OS function or be interrupted by it. Operating systems 120 can be found on almost any device with computing or processing ability. Examples of popular modern operating systems include Android, BSD, iOS, Linux, OS X, QNX, Microsoft Windows, Windows Phone, and IBM z/OS. Most of these (except Windows, Windows Phone and z/OS) may share roots in UNIX.

Operating system settings 125 may include a software function that opens a display that lists OS functions that may be generated upon selection of a user interface button. Such a list of OS functions may be associated with various options that allow the user to designate certain preferences or settings with respect to how certain operating system functions are performed (e.g., display preferences, wireless network preferences, information sharing, accessibility of applications to system information, such as GPS/location, notifications). Once these settings 125 are set, the operating system 120 uses the settings 125 to perform various functions, which includes functions related to execution of an application.

Antenna 130 may be an antenna that allows user device 105 to communicate wirelessly over the communication network 170. Such antenna 130 may communicate over WiFi, 4G/3G, Bluetooth, and/or any other known radio frequency communication network known in the art.

User devices 105 may organize groups of applications into multiple screens that may be navigated via touch gestures and other user input known in the art for moving around computing screens. Such screens may be categorized by application status or classification. As noted above, such classification may be based at least in part on timer status (e.g., active, old, trash). As such, an application of a certain age may be moved from the active screen 110 (or timer screen 140) to the old screen 150 (and/or trash screen 160).

The applications located on the respective screens may include any number of software applications installed on the user device 105, including applications downloaded from an app store. Some applications may be specific to a calendar event, season, and/or other time events. For example, an application may be developed for a particular arts festival, a particular sports season, or a tourist destination. A user may not wish to keep such an application on their user device 105 year-round or indefinitely, as such apps may only need to be used for a temporary or seasonal basis. As such, the user may designate certain timer classification rules to be associated with an application, such that the application may be automatically downloaded and then deleted as needed to maximize efficiency of user device 105.

Cloud communication network 170 may be a local, proprietary network (e.g., an intranet) and/or may be a part of a larger wide-area network. Cloud communication network 170 may comprise a variety of connected computers that may provide a set of network-based services. Such network service may be provided by real server hardware and/or by virtual hardware as simulated by software running on one or more real machines. Such virtual servers may not physically exist and can therefore be moved around and scaled up (or down) on the fly without affecting end-users (e.g., like a cloud).

Cloud communication network 170 allow for communication between the user devices 105 and other devices via various communication paths or channels (e.g., communication link 135). Such paths or channels may include any type of data communication link known in the art, including TCP/IP connections and Internet connections via Wi-Fi, Bluetooth, UMTS, etc. In that regard, communications network 130 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider.

App timer share database 175, third party database 180, and advertiser database 185 may include any type of data storage device known in the art and may organize any data relating to timer, app, and screen management. In this regard, app timer share database 175, third party database 180, and advertiser database 185 may be part of or affiliated with any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

App timer share database 175 may receive timer, app, and screen management data from various user devices 105 and may update its respective databases, as well as allow for sharing among designated contacts. For example, app timer share database 175 may further provide timer, app, and screen management data to authorized users upon request. For example, a first user may wish to see how their contacts have managed their timer, app, and screen settings. App timer share database 175 may identify which of the first user's contacts that have agreed to share timer, app, and screen data with the first user and retrieve timer, app, and screen data for those identified contacts. Such sharing may occur in association with social networks.

Third party database 180 and advertiser database 185 are specific types of databases that may track information regarding timer, app, and screen management. Third parties may include application developers and other service providers that may use such data to research and improve their own applications or services. Likewise, advertisers may wish to track timer management trends, adoption statistics, and deletion statistics to evaluate their advertising spend.

Figure 2:
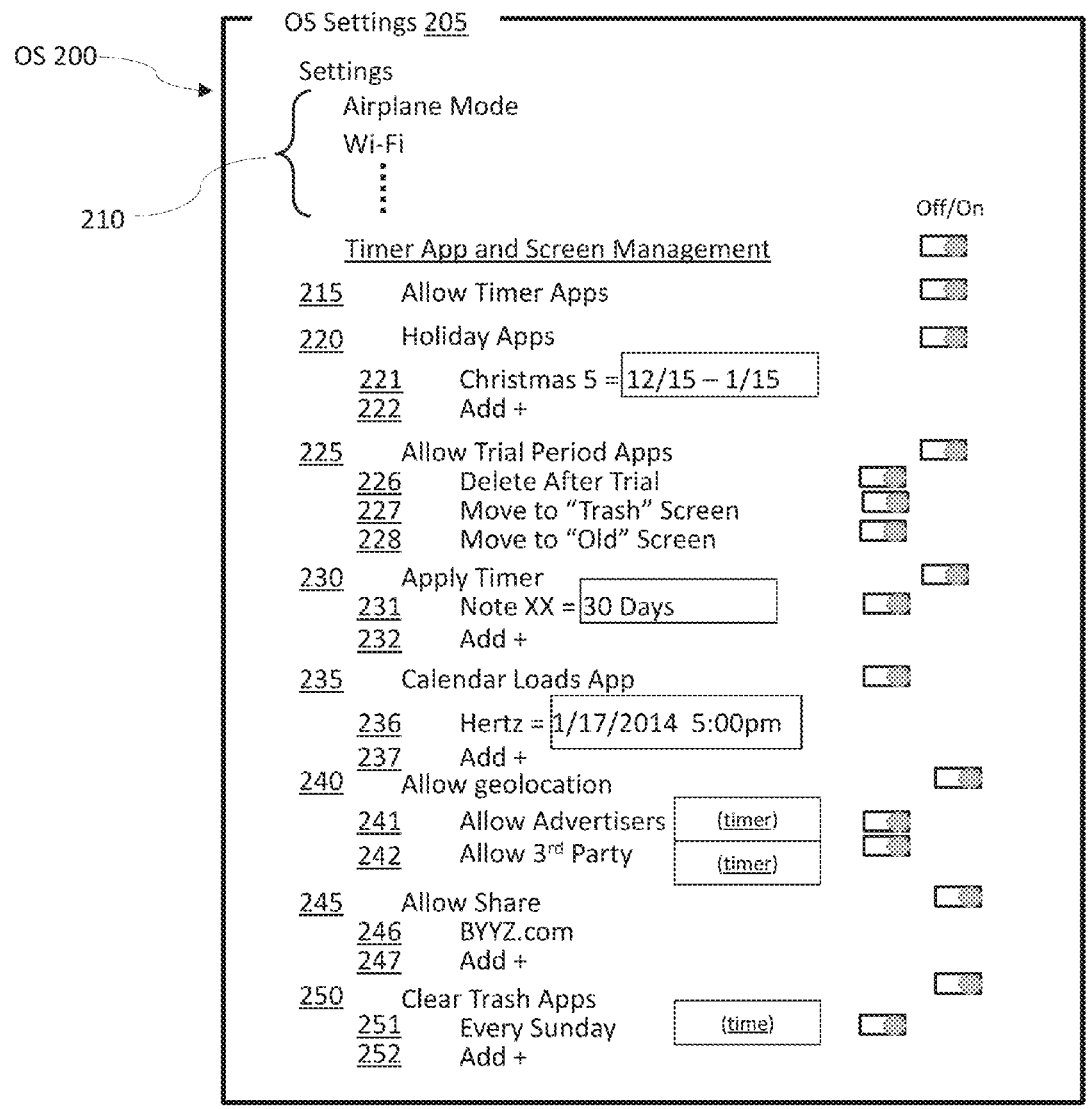
FIG. 2 is a diagram illustrating exemplary settings on a mobile device that may be used with a system for providing for timer, app, and screen management.

FIG. 2 is a diagram illustrating exemplary settings 205 of an operating system 200 on a mobile device that may be used with a system for providing for timer, app, and screen management. Such settings 205 may include general settings 210, such as airplane mode or WiFi settings, as well as settings specific to timer, app, and screen management.

Such settings specific to timer, app, and screen management may include options to allow time apps 215, holiday apps 220 (e.g., defining a Christmas season 221 and other seasons to be added), allow trial period apps 225 (e.g., including sub-options to delete after trial 226, move to trash screen 227, and move to old screen 228), apply time 230 (e.g., including sub-options to define a time period 231 and other time periods to be added 232), calendar loads app 235 (e.g., including defining which app to download when calendar event is met 236 and others to be added 237), allow geolocation 240 (e.g., including allow advertisers 241 and allow third party 242), allow share 245 (e.g., with designated contacts BYYZ.com 246 and others to be added 247), and clear trash apps 250 (e.g., on designated days and times 251 and others to be added 252).

Such settings allow the user to define periods of time during which an app may be likely to be useful to the user. For example, a Christmas-themed application may only be useful or amusing to the user during a time period shortly before or after Christmas day. As such, the user may designate one or more apps as associated with a timer classification rule. In executing such a rule, the designated apps may be downloaded on a particular date, kept on the active screen for a certain time period, and then moved (or deleted) to an old or trash screen when the time period has expired.

Likewise, the user may also designate certain apps as trial period apps and further designate what is to be done with such apps at the end of the trial period. Such apps may be automatically deleted, moved to a trash screen (e.g., to be deleted in conjunction with other apps on the trash screen), or moved to an old screen (e.g., for temporary reference, organization, or queuing for deletion).

Geo-location-based apps may further allow for download of certain apps specific to a particular location. The user may only be passing through, however, so such apps may no longer be useful after a period of time. As a result, such apps may be queued for deletion once the user device is no longer detected within a range of the geo-location.

Figure 3:
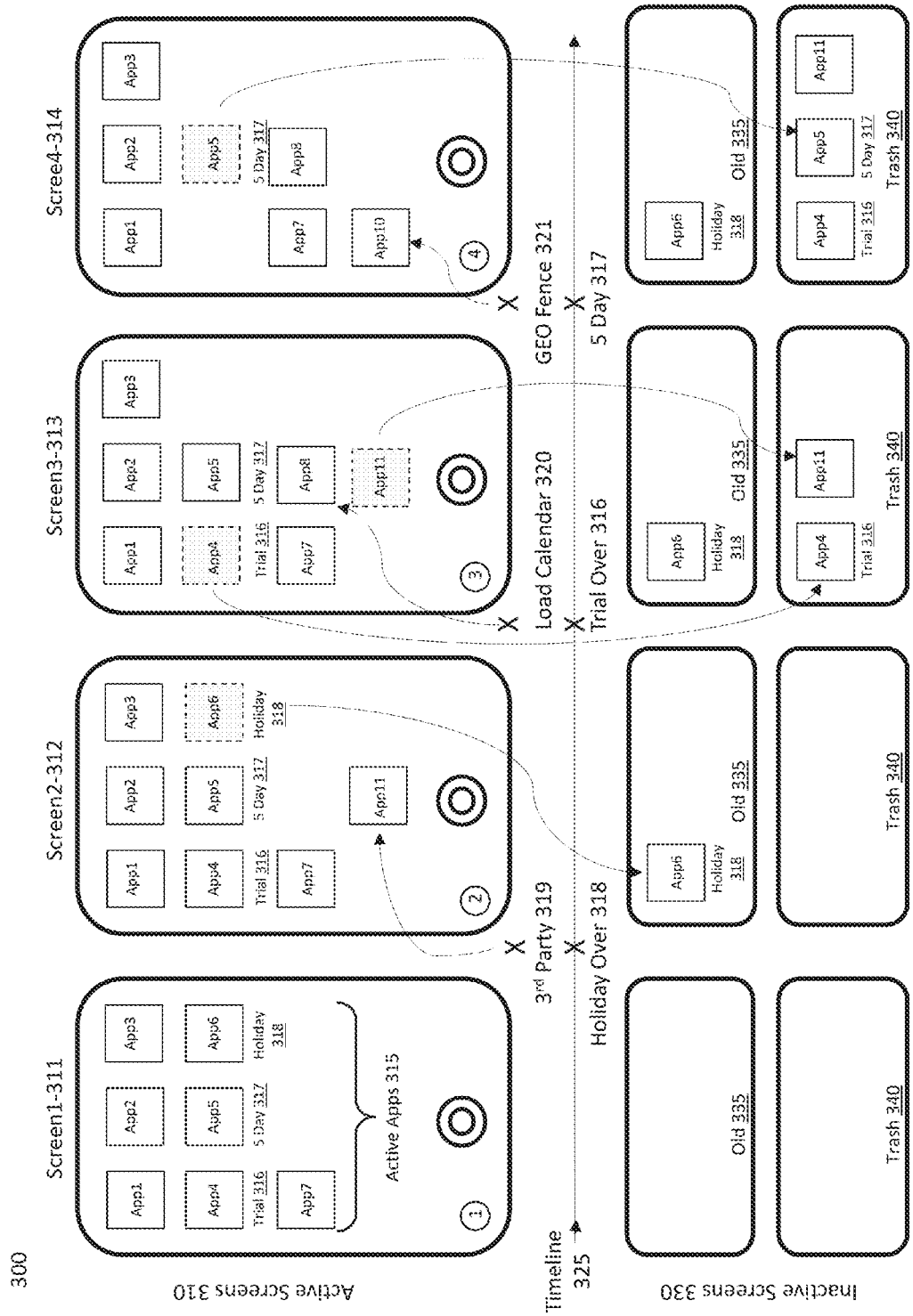
FIG. 3 illustrate exemplary screens on a mobile device that may be used with a system for providing for timer, app, and screen management.

FIG. 3 illustrate exemplary screens on a mobile device that may be used with a system for providing for timer, app, and screen management. Such screens may be categorized as active screens 310 or inactive screens 330. Screens 1-4 311-314 may be considered active screens 310, while old screen 335 and trash screen 340 may be considered inactive screens 330.

As illustrated in the first column, active screen 1 311 may include seven currently active apps 315 of which App4 may be a trial app 315, App5 may be a 5 day app 317, and App6 may be a holiday app 318. As time passes (further down timeline 325), the holiday season may be detected as being over 318.

As illustrated in the second column, following such detection that the holiday season is over 318, App6 may be automatically moved from active screen 2 312 to old screen 335. In addition, a new app (App11) may be automatically loaded by a third party 319 (e.g., advertisement app).

Further down the timeline 325, the trial period may be detected as being over 316. As illustrated in the third column, App4 was associated with the trial period 316 and is therefore automatically moved to the trash screen 340. Likewise, advertising-related App11 may also be moved to trash as it may be detected as having been watched or played. Further, App8 may be associated with a rule allowing for downloading when a certain calendar event has occurred. The load calendar event 320 may be detected, and as a result, App8 may be downloaded.

Yet further down the timeline 325, the 5 day period 317 has expired, and a geo-fence rule 321 is triggered. App5, which was associated with the 5 day period 317, may be automatically moved to trash screen 340, while App5, which is associated with the geo-fence rule 321 may be loaded onto the active screen 4 314.

Figure 4:
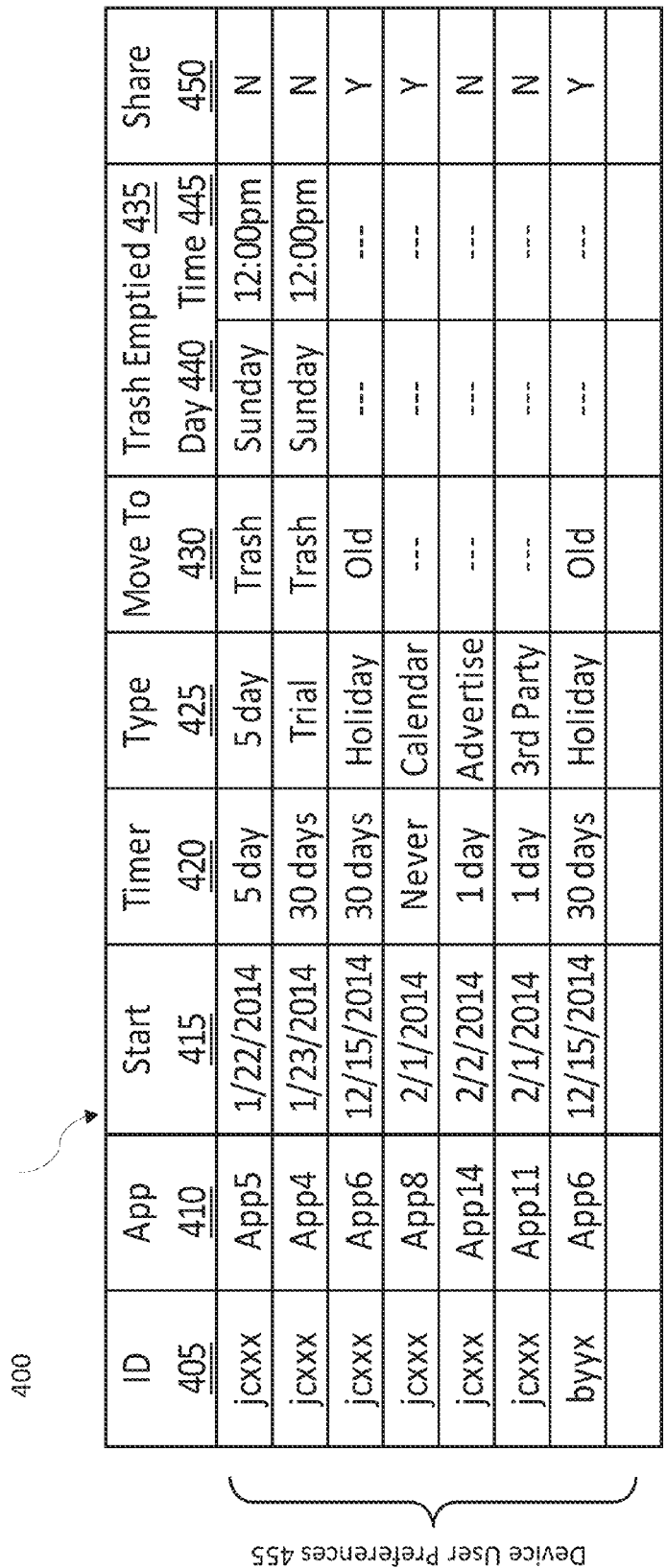
FIG. 4 illustrates an exemplary database that may be used with a system for providing for timer, app, and screen management.

FIG. 4 illustrates an exemplary database 400 that may be used with a system for providing for timer, app, and screen management. App timer database 400 may track information regarding user ID 405, app name 410, start time 415, timer period 420, time period type 425, destination/move to screen 430, trash emptying schedule (e.g., day 440 and time 445), and share options 450.

App timer database 400 may be any type of local database that stores a user's settings related to how the user wants to manage timers and applications. App timer database 400 may be an organized collection of data, which may be typically organized to model relevant aspects of reality in a way that supports processes requiring this information. For example, such database 400 may include listings of applications by user (and by contacts of the user).

Each row represents a timer classification rule or device user preference 455. For example, the first row indicates that a user with a user ID of jcxxx has defined a timer classification rule for App5. Such rule indicates that the app is to be downloaded, loaded, moved to active status, or otherwise activated on Jan. 22, 2014. Such active status is to last for five days, after which App5 may be moved to the trash screen. The trash screen is designated to be emptied on Sundays at twelve noon.

Further, such a rule is not designated for sharing with other users, third parties, or advertisers.

Figure 5:
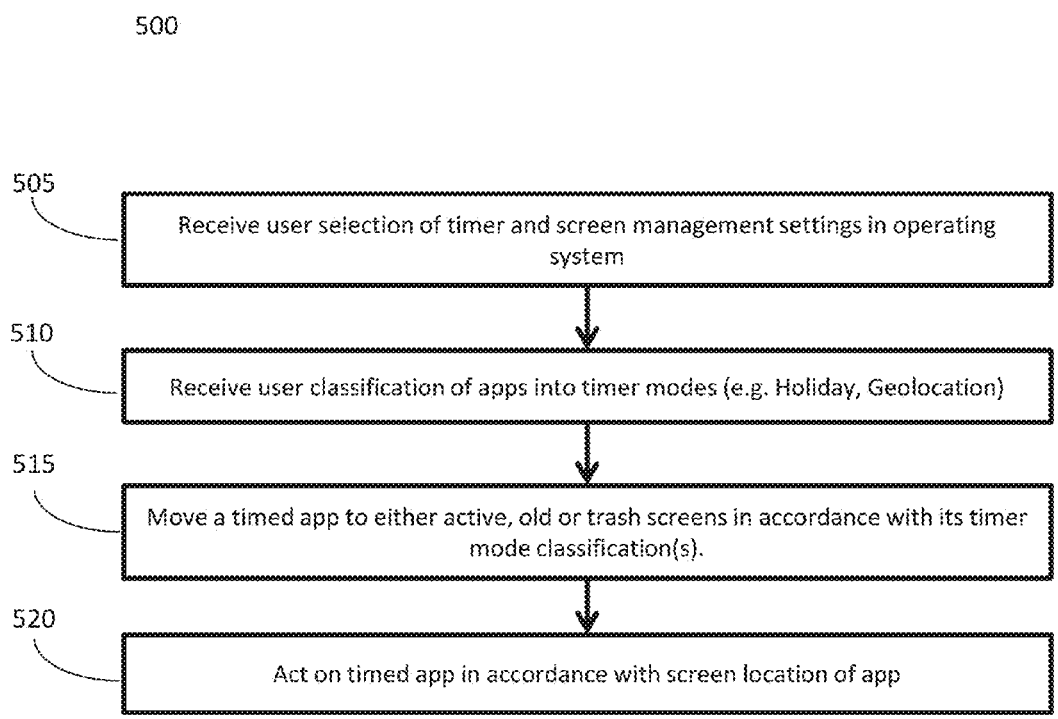
FIG. 5 is a flowchart illustrating an exemplary method for timer, app, and screen management.

FIG. 5 is a flowchart illustrating an exemplary method 500 for timer, app, and screen management. In step 510, a user may select settings relating to timer, app, and screen management. Such settings may be integrated into operating system settings or may be accessible via a separate app.

In step 510, user may associate certain apps with certain timer classification rules. For example, the user may designate a particular travel app to be used on a short trip as a five day app to be downloaded and then deleted after five days.

In step 515, the end of the time period is detected as having occurred, and the app associated with the timer classification rule in step 510 may be automatically moved to another screen (e.g., old or trash).

In step 520, the screen may be acted upon based on certain screen timer settings. For example, a trash screen may be emptied out weekly (e.g., every Sunday at 5 PM). As such, any and all apps on the trash screen may be deleted.

Figure 6:
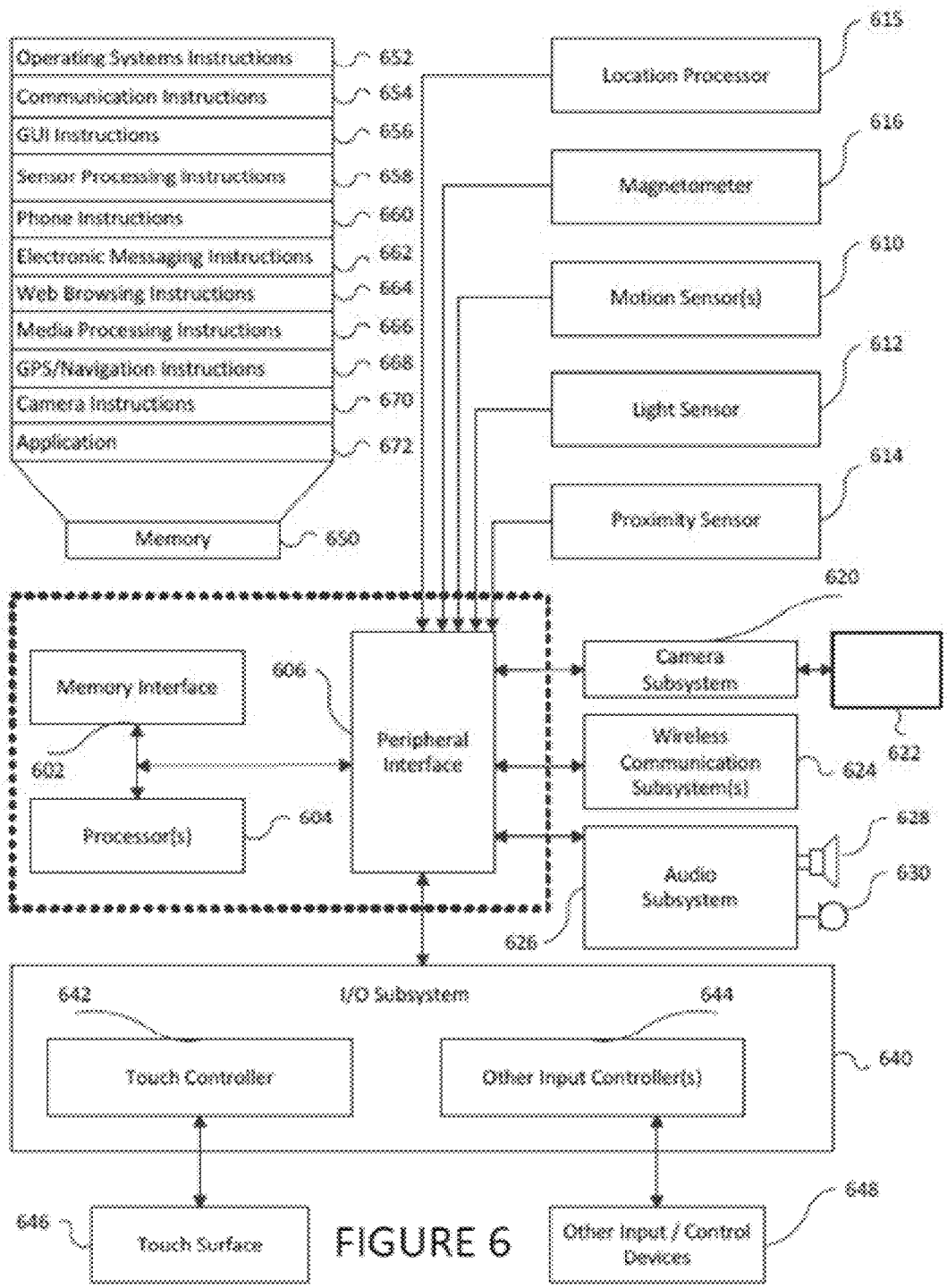
FIG. 6 illustrates a mobile device architecture that may be utilized to implement the various features and processes described herein.

FIG. 6 illustrates a mobile device architecture that may be utilized to implement the various features and processes described herein. Architecture 600 can be implemented in any number of portable devices including but not limited to smart phones, electronic tablets, and gaming devices. Architecture 600 as illustrated in FIG. 6 includes memory interface 602, processors 604, and peripheral interface 606. Memory interface 602, processors 604 and peripherals interface 606 can be separate components or can be integrated as a part of one or more integrated circuits. The various components can be coupled by one or more communication buses or signal lines.

Processors 604 as illustrated in FIG. 6 are meant to be inclusive of data processors, image processors, central processing unit, or any variety of multi-core processing devices. Any variety of sensors, external devices, and external subsystems can be coupled to peripherals interface 606 to facilitate any number of functionalities within the architecture 600 of the exemplar mobile device. For example, motion sensor 610, light sensor 612, and proximity sensor 614 can be coupled to peripherals interface 606 to facilitate orientation, lighting, and proximity functions of the mobile device. For example, light sensor 612 could be utilized to facilitate adjusting the brightness of touch surface 646. Motion sensor 610, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 606, such as a temperature sensor, a biometric sensor, or other sensing device to facilitate corresponding functionalities. Location processor 615 (e.g., a global positioning transceiver) can be coupled to peripherals interface 606 to allow for generation of geo-location data thereby facilitating geo-positioning. An electronic magnetometer 616 such as an integrated circuit chip could in turn be connected to peripherals interface 606 to provide data related to the direction of true magnetic North whereby the mobile device could enjoy compass or directional functionality. Camera subsystem 620 and an optical sensor 622 such as a charged coupled device (CCD) or a complementary metal-oxide semiconductor (CMOS) optical sensor can facilitate camera functions such as recording photographs and video clips.

Communication functionality can be facilitated through one or more communication subsystems 624, which may include one or more wireless communication subsystems. Wireless communication subsystems 624 can include 802.5 or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 624 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.5 communication networks, code division multiple access (CDMA) networks, or Bluetooth networks. Communication subsystem 624 may include hosting protocols such that the device may be configured as a base station for other wireless devices. Communication subsystems can also allow the device to synchronize with a host device using one or more protocols such as TCP/IP, HTTP, or UDP.

Audio subsystem 626 can be coupled to a speaker 628 and one or more microphones 630 to facilitate voice-enabled functions. These functions might include voice recognition, voice replication, or digital recording. Audio subsystem 626 in conjunction may also encompass traditional telephony functions.

I/O subsystem 640 may include touch controller 642 and/or other input controller(s) 644. Touch controller 642 can be coupled to a touch surface 646. Touch surface 646 and touch controller 642 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 646 may likewise be utilized. In one implementation, touch surface 646 can display virtual or soft buttons and a virtual keyboard, which can be used as an input/output device by the user.

Other input controllers 644 can be coupled to other input/control devices 648 such as one or more buttons, rocker switches, thumb-wheels, infrared ports, USB ports, and/or a pointer device such as a stylus. The one or more buttons (not shown) can include an up/down button for volume control of speaker 628 and/or microphone 630. In some implementations, device 600 can include the functionality of an audio and/or video playback or recording device and may include a pin connector for tethering to other devices.

Memory interface 602 can be coupled to memory 650. Memory 650 can include high-speed random access memory or non-volatile memory such as magnetic disk storage devices, optical storage devices, or flash memory. Memory 650 can store operating system 652, such as Darwin, RTXC, LINUX, UNIX, OS X, ANDROID, WINDOWS, or an embedded operating system such as VXWorks. Operating system 652 may include instructions for handling basic system services and for performing hardware dependent tasks. In some implementations, operating system 652 can include a kernel.

Memory 650 may also store communication instructions 654 to facilitate communicating with other mobile computing devices or servers. Communication instructions 654 can also be used to select an operational mode or communication medium for use by the device based on a geographic location, which could be obtained by the GPS/Navigation instructions 668. Memory 650 may include graphical user interface instructions 656 to facilitate graphic user interface processing such as the generation of an interface; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes, camera instructions 670 to facilitate camera-related processes and functions; and instructions 672 for any other application that may be operating on or in conjunction with the mobile computing device. Memory 650 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 650 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer may employ to access functions supporting the API. In some implementations, an API call can report to an application the capabilities of a device running the application, such as input capability, output capability, processing capability, power capability, and communications capability.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed:

1. A method for providing application management, the method comprising:
   storing information in a memory of a first device regarding a plurality of software applications;
   storing a first timed application rule, the first timed application rule identifying at least a first software application and a first time event and a second time event and a first classification category, the first time event corresponding to a first calendar date and a first time of day, the second time event corresponding to a second calendar date and a second time of day; and
   executing instructions stored in the memory, wherein execution of the instructions by a processor of the first device:
      detects that the first time event has occurred by detecting that the first time of day has occurred on the first calendar date,
      downloads at least the first software application into the memory from an application storage repository upon detection of the first time event,
      classifies at least the first software application into the first classification category,
      detects that the second time event has occurred by detecting that the second time of day has occurred on the second calendar date, and
      deletes at least the first software application from the memory upon detection of the second time event.

2. The method of claim 1, wherein execution of the instructions by the processor further identifies that the first software application has not been executed between the first time event and the second time event, wherein deleting the first software application from the memory is at least partly based on this identified non-execution of the first software application.

3. The method of claim 1, further comprising identifying a location of the mobile device, wherein the first classification category is based at least partially on the determined location.

4. The method of claim 1, wherein classifying the first software application into the first classification category includes moving the first software application to be arranged on a designated screen associated with the first classification category.

5. The method of claim 4, wherein deleting at least the first software application from the memory upon detection of the second time event includes deleting all of a set of applications on the designated screen.

6. The method of claim 1, further comprising sending the first timed application rule over a communication network to a remote share database of a remote share database server.

7. The method of claim 1, further comprising receiving a second timed application rule associated with a second device, the second timed application rule sent by a remote share database server over a communication network, the remote share database server having retrieved the second timed application rule from a remote share database of the remote share database server.

8. An apparatus for providing application management, the apparatus comprising:
- a memory that stores information regarding a plurality of applications and that also stores a first timed application rule, wherein the first timed application rule identifies at least a first software application and a first time event and a second time event and a first classification category, the first time event corresponding to a first calendar date and a first time of day, the second time event corresponding to a second calendar date and a second time of day; and
- a processor that executes instructions stored in the memory, wherein execution of the instructions by the processor:
  - detects that the first time event has occurred by detecting that the first time of day has occurred on the first calendar date,
  - downloads at least the first software application into the memory from an application storage repository upon detection of the first time event,
  - classifies at least the first software application into the first classification category,
  - detects that the second time event has occurred by detecting that the second time of day has occurred on the second calendar date, and
  - deletes at least the first software application from the memory upon detection of the second time event.

9. The apparatus of claim 8, wherein execution of the instructions by the processor further identifies that the first software application has not been executed between the first time event and the second time event, wherein deleting the first software application from the memory is at least partly based on this identified non-execution of the first software application.

10. The apparatus of claim 8, execution of the instructions by the processor further identifies a location of the processor, wherein the first classification category is based at least partially on the determined location.

11. The apparatus of claim 8, wherein classifying the first software application into the first classification category includes moving the first software application to be arranged on a designated screen associated with the first classification category.

12. The apparatus of claim 11, wherein deleting at least the first software application from the memory upon detection of the second time event includes deleting all of a set of applications on the designated screen.

13. The apparatus of claim 8, further comprising a communication interface coupled to the processor that sends the first timed application rule over a communication network to a remote share database of a remote share database server.

14. The apparatus of claim 8, further comprising a communication interface coupled to the processor that receives a second timed application rule associated with a second device, the second timed application rule sent by a remote share database server over a communication network, the remote share database server having retrieved the second timed application rule from a remote share database of the remote share database server.

15. A non-transitory computer-readable storage medium, having embodied thereon a program executable by a processor to perform a method application management, the method comprising:
- storing information in a memory regarding a plurality of software applications;
- storing a first timed application rule, the first timed application rule identifying at least a first software application and a first time event and a second time event and a first classification category, the first time event corresponding to a first calendar date and a first time of day, the second time event corresponding to a second calendar date and a second time of day;
- detecting that the first time event has occurred by detecting that the first time of day has occurred on the first calendar date;
- downloading at least the first software application into the memory from an application storage repository upon detection of the first time event;
- classifying at least the first software application into the first classification category;
- detecting that the second time event has occurred by detecting that the second time of day has occurred on the second calendar date; and
- deleting at least the first software application from the memory upon detection of the second time event.

* * * * *